United States Patent [19]

Kessel et al.

[11] Patent Number: 5,099,901
[45] Date of Patent: Mar. 31, 1992

[54] PNEUMATIC VEHICLE TIRE WITH BEAD CORES EMBEDDED IN NON-ADHERING SHEATHINGS

[75] Inventors: Stephan Kessel; Gert Schlösser, both of Aachen, Fed. Rep. of Germany

[73] Assignee: Uniroyal Englebert Reifen GmbH, Aachen, Fed. Rep. of Germany

[21] Appl. No.: 494,135

[22] Filed: Mar. 14, 1990

[30] Foreign Application Priority Data

Mar. 15, 1989 [DE] Fed. Rep. of Germany ....... 3908399

[51] Int. Cl.$^5$ .......................... B60C 15/04; B60C 1/00
[52] U.S. Cl. ..................................... 152/540; 152/544; 152/547
[58] Field of Search ...................... 152/540, 565, 379.3, 152/379.5, 380, 544; 156/910; 524/269; 428/462

[56] References Cited

U.S. PATENT DOCUMENTS

| 2,558,584 | 6/1957 | Safford | 524/269 |
| 2,720,495 | 10/1955 | Phreaner | 524/269 |
| 3,957,718 | 5/1976 | Pochert et al. | 152/565 |
| 4,222,915 | 9/1980 | Wolff et al. | 524/269 |
| 4,781,232 | 11/1988 | Klose | 152/540 |

FOREIGN PATENT DOCUMENTS 0346663 12/1989 European Pat. Off. ......... 152/379.3

OTHER PUBLICATIONS

"Encyclopedia of Chemical Technology", Kirk-Othmer, 3rd edition, vol. 20, pp. 386-390, 922-940.
"Ullmanns Enclyclopädie der technischen Chemie", Schwefel bis Sprengstoffe, band 21, pp. 498-499.
"The Merck Index", Editor Budavari et al., 11th edition, p. 8436.

Primary Examiner—Michael W. Ball
Assistant Examiner—Nancy T. Krawcyzk
Attorney, Agent, or Firm—Robert W. Becker & Associates

[57] ABSTRACT

A pneumatic vehicle tire where the sheathing of the bead core ring is made of an elastomeric mixture that adheres well to steel and that contains plasticizer in the form of aromatic oils comprising approximately 2-10 parts silicon oil per one hundred parts elastomer. As a result, the bead core ring sheathing does not fuse with other rubber mixtures and the bead core has a high ability to turn.

4 Claims, 1 Drawing Sheet

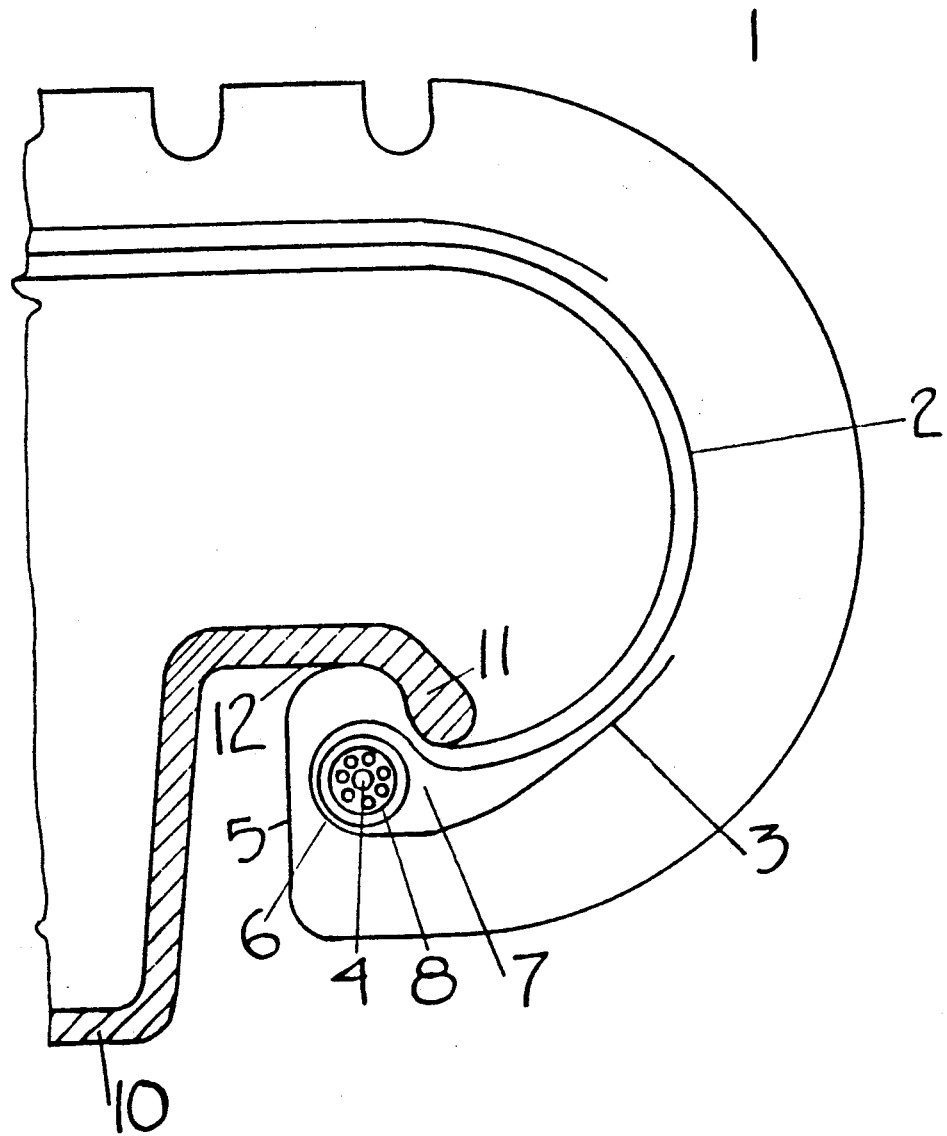

PNEUMATIC VEHICLE TIRE WITH BEAD CORES EMBEDDED IN NON-ADHERING SHEATHINGS

BACKGROUND OF THE INVENTION

The present invention relates to a pneumatic vehicle tire of belted radial carcass construction with tire beads that are turned axially inwardly and radially outwardly, with each tire bead having a bead core ring that is resistant to compression and bending, with ends of the carcass being anchored about the bead core rings, and with each bead core ring being surrounded by a sheathing made of a vulcanizable elastomeric mixture that cannot fuse with rubber of the carcass and/or rubber of the tire beads.

A pneumatic vehicle tire of this general type is disclosed in German application 38 08 278. In this known tire, each bead core is formed of metal wires and is resistant to compression and bending, with the bead core having a sheathing that is made of a material, for example a rubber mixture, that has a Shore A hardness of greater than 70° and has a relatively smooth surface.

With a pneumatic vehicle tire having tire beads that are turned inwardly, it is necessary during mounting of such a tire on a wheel rim that is specially designed therefor, that the bead cores along with their sheathings be able to advantageously turn relative to the surrounding rubber of the tire bead and of the carcass. This necessitates mixtures that do not fuse with the surrounding rubber.

Such known mixtures comprise rubber mixtures on a basis of butyl rubber or chloroprene rubber. However, these rubber mixtures do not have a great enough adhesion to steel elements of a tire component that is stressed as greatly as is the bead core ring of a pneumatic vehicle tire. In addition, known mixtures that exhibit a better adhesion to steel elements also fuse very well with the surrounding rubber of the bead. It is furthermore known to improve the ability of the bead core ring to turn by producing it as a finished part that is dusted with zinc stearate, or that is sprayed with lubricant. Unfortunately, these measures pollute the environment and must be avoided. It is desirable to improve the ability of the bead core rings to turn without having to use the heretofore known auxiliary measures.

It is therefore an object of the present invention to provide a rubber or elastomeric mixture that adheres well to steel and provides a sufficiently rigid and hard bead core ring sheathing, and that does not fuse with the rubber of the carcass and/or of the bead, but rather as a mixture itself ensures a high ability to turn.

BRIEF DESCRIPTION OF THE DRAWING

This object, and other objects and advantages of the present invention, will appear more clearly from the following specification in conjunction with the accompanying schematic FIG. 1, which is a partial cross-sectional view of one exemplary embodiment of the inventive pneumatic vehicle tire.

SUMMARY OF THE INVENTION

The present invention is characterized primarily in that the elastomeric mixture of the sheathing comprises elastomeric material, especially natural rubber (NR) and/or styrene-butadiene rubber (SBR), that adheres greatly to steel, contains reinforcing fillers, especially black, and contains approximately 10 parts aromatic oil per hundred parts elastomeric material, with said aromatic oil comprising 2–10 parts silicone oil per hundred parts elastomeric material, and with the elastomeric material further containing a sulfenamide accelerator and sulfur.

An elastomeric mixture on the basis of natural or synthetic rubber, or a blend of the two, in which the plasticizer is partially or entirely replaced with silicone oil, has the advantages that on the one hand the elastomer mixture adheres well to steel and has a sufficient hardness, and on the other hand the property of the elastomer mixture is changed in such a way that it does not fuse with other rubber mixtures, with this being true whether the vulcanization of the bead core sheathing and of the tire bead is effected simultaneously or one after the other. The silicone oil portion of the mixture acts not only as a plasticizer but also as an agent that prevents the mixture from fusing with other mixtures and ensures a relatively high sliding ability for the bead core ring.

Further specific features of the present invention will be described in detail subsequently.

DESCRIPTION OF PREFERRED EMBODIMENTS

Referring now to the drawing in detail, shown is a pneumatic vehicle tire 1, the ends 3 of the carcass 2 of which are anchored about bead core rings 4 in the tire beads 5.

Each bead ring 4 comprises wire elements and is encased by a sheathing 8 that is made of an elastomer or rubber mixture that can be vulcanized This mixture comprises, for example, natural rubber that adheres very well to steel elements and that in the vulcanized state has a Shore A hardness of greater than 70°. This rubber mixture for the sheathing 8 fuses neither with the rubber 6 of the carcass nor with the rubber 7 of the tire bead 5 The seven parts silicone oil contained in the rubber mixture guarantee a high nonfusability of the sheathing. This assures a high turning ability of the bead core ring during a mounting process. When such a pneumatic vehicle tire is mounted, the tire bead 5, together with its bead core ring 4, are moved over the rim flange 11 of the wheel rim 10, so that the tire bead 5 of the pneumatic vehicle tire 1 can assume its seated position on the shoulder 12 of the rim. For this purpose, it is necessary that the sheathed bead core ring be able to turn relative to the surrounding rubber of the carcass and bead. The inventive sheathing mixture ensures that this can take place because due to the presence of the silicone oil, the sheathing mixture can slide very well in the bead.

EXAMPLE 1

One preferred formulation for the elastomeric mixture of a sheathing of a bead core ring for the inventive pneumatic vehicle tire comprises:

| Component | Parts per hundred parts rubber (phr) |
|---|---|
| NR - 100 parts | |
| Black N 660 | 100 |
| Aromatic oil replaced by silicone oil | 10 2–10 |
| Zinc oxide | 10 |
| Stearic acid | 5 |
| Adhesive resin | 4 |
| Sulfenamide accelerator | 1.3 |

-continued

| Component | Parts per hundred parts rubber (phr) |
|---|---|
| Sulfur | 3 |

EXAMPLE 2

Another preferred formulation for the elastomeric mixture of a sheathing of a bead core ring for the inventive pneumatic vehicle tire comprises:

| Component | Parts per hundred parts rubber (phr) |
|---|---|
| SBR - 100 parts | |
| Black N 660 | 100 |
| Aromatic oil | 10 |
| replaced by | |
| silicone oil | 2-10 |
| Zinc oxide | 10 |
| Stearic acid | 5 |
| Adhesive resin | 4 |
| Sulfenamide accelerator | 1.3 |
| Sulfur | 3 |

The resulting sheathing for a bead core ring obtained with such a mixture has a Shore A hardness of greater than 70°, is relatively smooth on the outside, and does not fuse with either the surrounding rubber of the carcass or the rubber of the bead, which surrounds the components of the bead.

The present invention is, of course, in no way restricted to the specific disclosure of the specification and drawing, but also encompasses any modifications within the scope of the appended claims.

What we claim is:

1. In a pneumatic vehicle tire of belted radial carcass construction with tire beads that are turned axially inwardly and radially outwardly, with each tire bead having a bead core ring that is resistant to compression and bending, with ends of said carcass being anchored about said bead core rings, and with each of said bead core rings being surrounded by a sheathing made of a vulcanizable elastomeric mixture that cannot fuse with rubber of said carcass and/or rubber of said tire bead, the improvement wherein:

said elastomeric mixture of said sheathing comprises elastomeric material that adheres greatly to steel, contains reinforcing fillers, and contains approximately 10 parts aromatic oil per 100 parts elastomeric material, with said aromatic oil comprising 2-10 parts silicone oil per 100 parts elastomeric material, and with said elastomeric material further containing a sulfenamide accelerator and sulfur.

2. A pneumatic vehicle tire according to claim 1, in which said elastomeric material is at least one of the group consisting of natural rubber and styrene-butadiene rubber.

3. A pneumatic vehicle tire according to claim 2, in which said reinforcing filler is black.

4. A pneumatic vehicle tire according to claim 3, in which said elastomeric mixture of said sheathing comprises 100 phr black N 660, 10 phr aromatic oil comprising 2-10 phr silicone oil, 10 phr zinc oxide, 5 phr stearic acid, 4 phr adhesive resin, 1.3 phr sulfenamide accelerator, and 3 phr sulfur.

* * * * *